(12) United States Patent
Floyd

(10) Patent No.: US 10,562,362 B2
(45) Date of Patent: Feb. 18, 2020

(54) CAGE TO CAGE LOCKING MECHANISM

(71) Applicant: Target Brands, Inc., Minneapolis, MN (US)

(72) Inventor: Edward Floyd, Minneapolis, MN (US)

(73) Assignee: TARGET BRANDS, INC., Minneapolis, MN (US)

(*) Notice: Subject to any disclaimer, the term of this patent is extended or adjusted under 35 U.S.C. 154(b) by 182 days.

(21) Appl. No.: 15/851,074

(22) Filed: Dec. 21, 2017

(65) Prior Publication Data
US 2019/0193495 A1 Jun. 27, 2019

(51) Int. Cl.
B60D 1/04 (2006.01)
B60D 1/54 (2006.01)
B62B 5/00 (2006.01)
B60D 1/36 (2006.01)
B62B 3/00 (2006.01)
B60D 1/06 (2006.01)
B60D 1/167 (2006.01)
B60D 1/00 (2006.01)

(52) U.S. Cl.
CPC .............. B60D 1/363 (2013.01); B60D 1/04 (2013.01); B60D 1/065 (2013.01); B60D 1/1675 (2013.01); B62B 3/002 (2013.01); B60D 2001/005 (2013.01); B62B 5/0079 (2013.01)

(58) Field of Classification Search
CPC ......... B62B 5/0079; B62B 3/002; B60D 1/04; B60D 2001/006; B60D 2001/005; B60D 1/54; B60D 2001/544

USPC ...................... 280/514, 515, 491.3
See application file for complete search history.

(56) References Cited

U.S. PATENT DOCUMENTS

| | | | | |
|---|---|---|---|---|
| 1,423,084 A | * | 7/1922 | Cotton | B60D 1/54 |
| | | | | 280/478.1 |
| 1,677,618 A | * | 7/1928 | Clement | B62D 63/06 |
| | | | | 280/408 |
| 1,848,956 A | * | 3/1932 | Koehler | B60D 1/04 |
| | | | | 280/491.3 |
| 2,253,791 A | * | 8/1941 | Kline | B60T 1/005 |
| | | | | 188/119 |
| 2,478,709 A | | 8/1949 | Riemann et al. | |
| 2,813,727 A | * | 11/1957 | Whalen | B60D 1/00 |
| | | | | 280/408 |
| 4,194,755 A | | 5/1980 | Youngblood | |
| 4,351,541 A | * | 9/1982 | Propst | B60B 33/00 |
| | | | | 105/1.4 |
| 7,004,489 B2 | * | 2/2006 | Brown | B60D 1/00 |
| | | | | 280/491.3 |
| 8,651,510 B2 | | 2/2014 | Fankhauser et al. | |
| 9,463,675 B2 | * | 10/2016 | Korhonen | B60D 1/54 |
| 2014/0312595 A1 | * | 10/2014 | Knowles | B60D 1/54 |
| | | | | 280/491.3 |

FOREIGN PATENT DOCUMENTS

| | | | | |
|---|---|---|---|---|
| FR | 2966120 | * | 4/1912 | ............... B62B 5/04 |
| FR | 2504461 | * | 10/1982 | ............... B60D 1/14 |

* cited by examiner

Primary Examiner — Anne Marie M Boehler
(74) Attorney, Agent, or Firm — Merchant & Gould P.C.

(57) ABSTRACT

The present disclosure provides a system and method for securing the connection between drawbars of carts and hitches. The system and method involves limiting the drawbar's freedom to pivot once the drawbar is coupled to a hitch.

11 Claims, 8 Drawing Sheets

CAGE TO CAGE LOCKING MECHANISM

BACKGROUND

Carts that connect to each other to form a train of carts towed by a tugger are used to transport materials in a warehouse. Commonly, each cart has a chassis supported on wheels, a hitch at the rear end of the chassis, and a drawbar at the front end of the chassis. The distal end of the drawbar of each chassis is configured to be coupled to the hitch of an adjacent cart. An existing configuration for the drawbar and hitch coupling involves a hitch that includes a rearward extending plate with a vertically oriented aperture ("hitch hole"). The drawbar terminates in a downwardly extending boss ("the boss") configured to be received in the aperture of the hitch hole. Typically, the drawbar is configured to pivot at least about a horizontal axis. The boss of one cart conveniently connects to the hitch hole of another cart by simply pivoting counter clockwise (upward) the drawbar and aligning the boss with the hitch hole. Once aligned the boss of the drawbar can be lowered into the hitch hole. The connection between the boss and the hitch hole allows the boss to pivot relative to the hitch hole about a vertical axis, thereby allowing the carts to track in a line when pulled.

The existing configuration is simple, which is desirable. There are very few moving parts to maintain and the coupling of a drawbar to a hitch is fast and efficient. However, a disadvantage of the current system is that the carts can inadvertently disconnect if the drawbar pivots counterclockwise, which can happen if the carts travel over a bump or if they are stopped abruptly. The present disclosure provides a system and method that preserves the advantages of the existing system while also addressing its drawbacks.

SUMMARY

In summary, the present disclosure provides a system and method for securing the connection between carts that are configured to connect to each other to form a train of carts. The system and method involves limiting the drawbar's freedom to pivot once it is connected to another cart. Various aspects are described in this disclosure, which include, but are not limited to, the following aspects.

DETAILED DESCRIPTION

Figure 1:
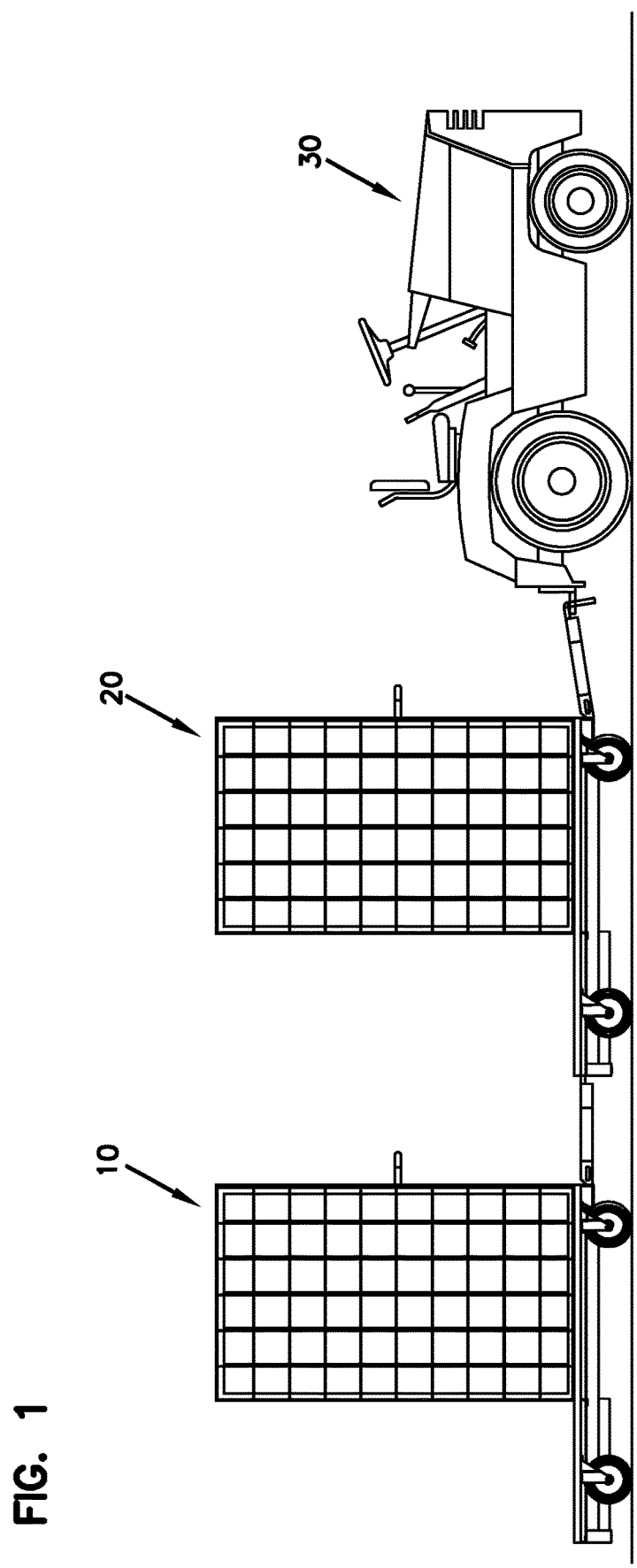
FIG. 1 is a side view of carts according to the present disclosure arranged in a train and being pulled by a tugger.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
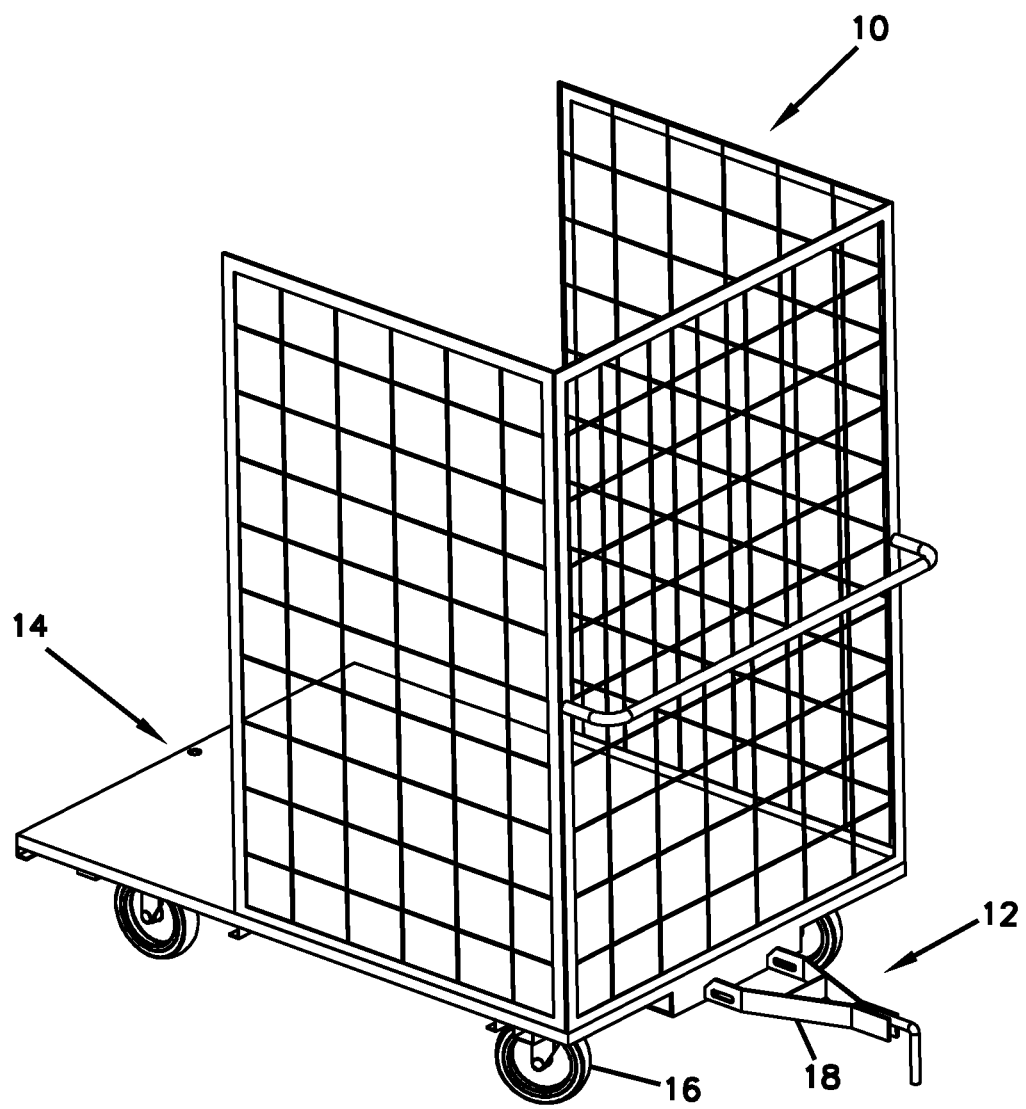
FIG. 2 is a front perspective view of an embodiment of a cart according to the present disclosure.
Figure 3:
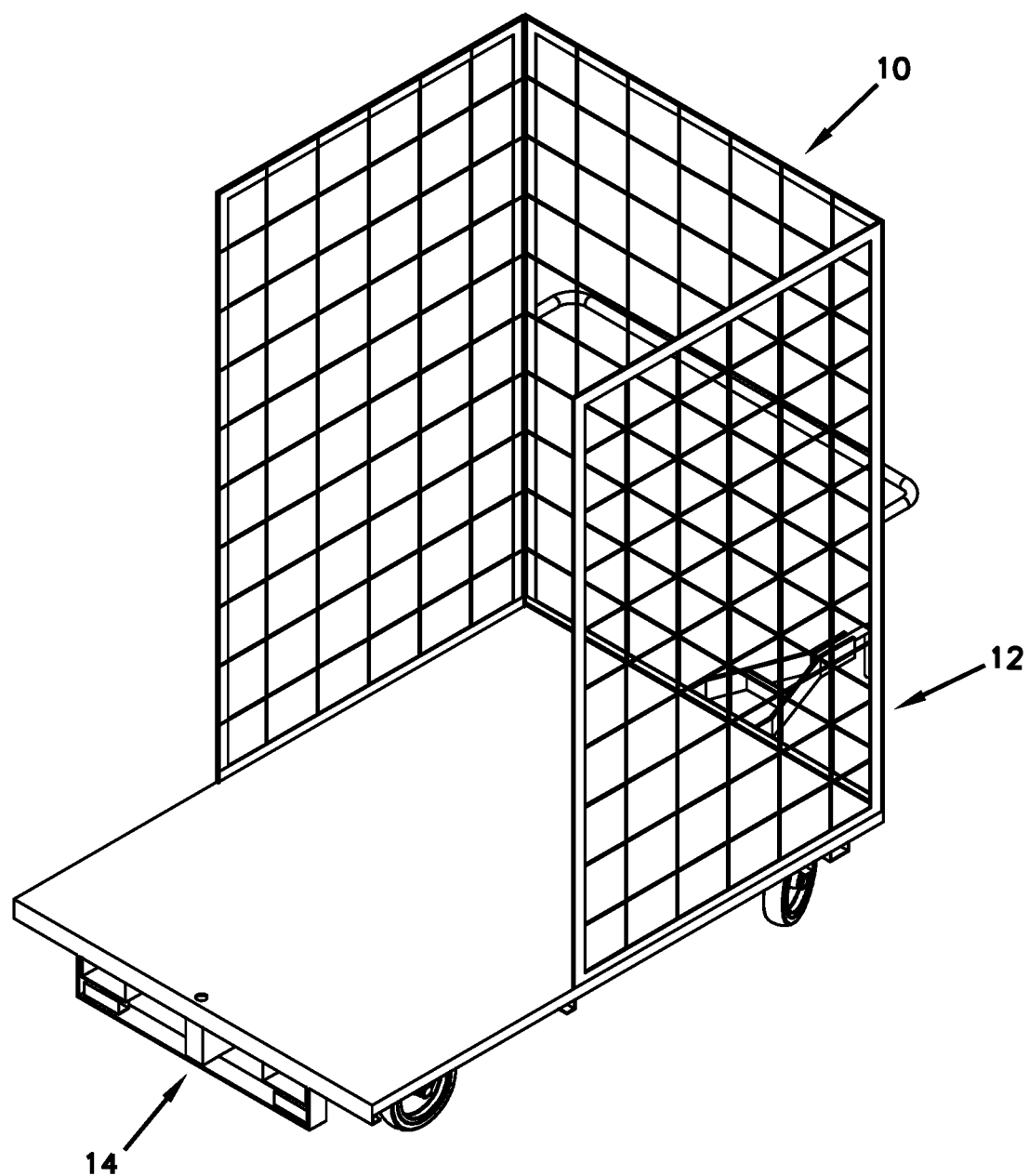
FIG. 3 is a rear perspective view of the cart of FIG. 1.

An embodiment of the present disclosure is described herein in further detail with reference to the figures. Referring to FIG. 1, an embodiment of the system includes multiple carts 10, 20 that are coupled to each other to form a train of carts. The train of carts is shown being towed by a tugger 30. An embodiment of a cart according to the present disclosure is described in more detail with reference to FIGS. 2-3. In the depicted embodiment, the cart 10 includes a chassis supported on a plurality of wheels 16. The chassis has a front end 12 and a rear end 14. It should be appreciated that many alternative embodiments are possible.

In the depicted embodiment, the cart 10 includes a drawbar 18 pivotally connected to the front end 12 of the chassis and a hitch assembly 22 located at the rear end 14 of the chassis. In the depicted embodiment, the drawbar 18 is pivotally connected to a drawbar mount (e.g., a pair of flanges) that extend from the front end 12 of the chassis. In the depicted embodiment, a pivot pin extends through the drawbar mount and the drawbar. The pivot pin defines a horizontal pivot axis of which the drawbar pivots. Many other configurations are also possible. For example, the drawbar could be configured to also pivot about a vertical axis.

Figure 5:
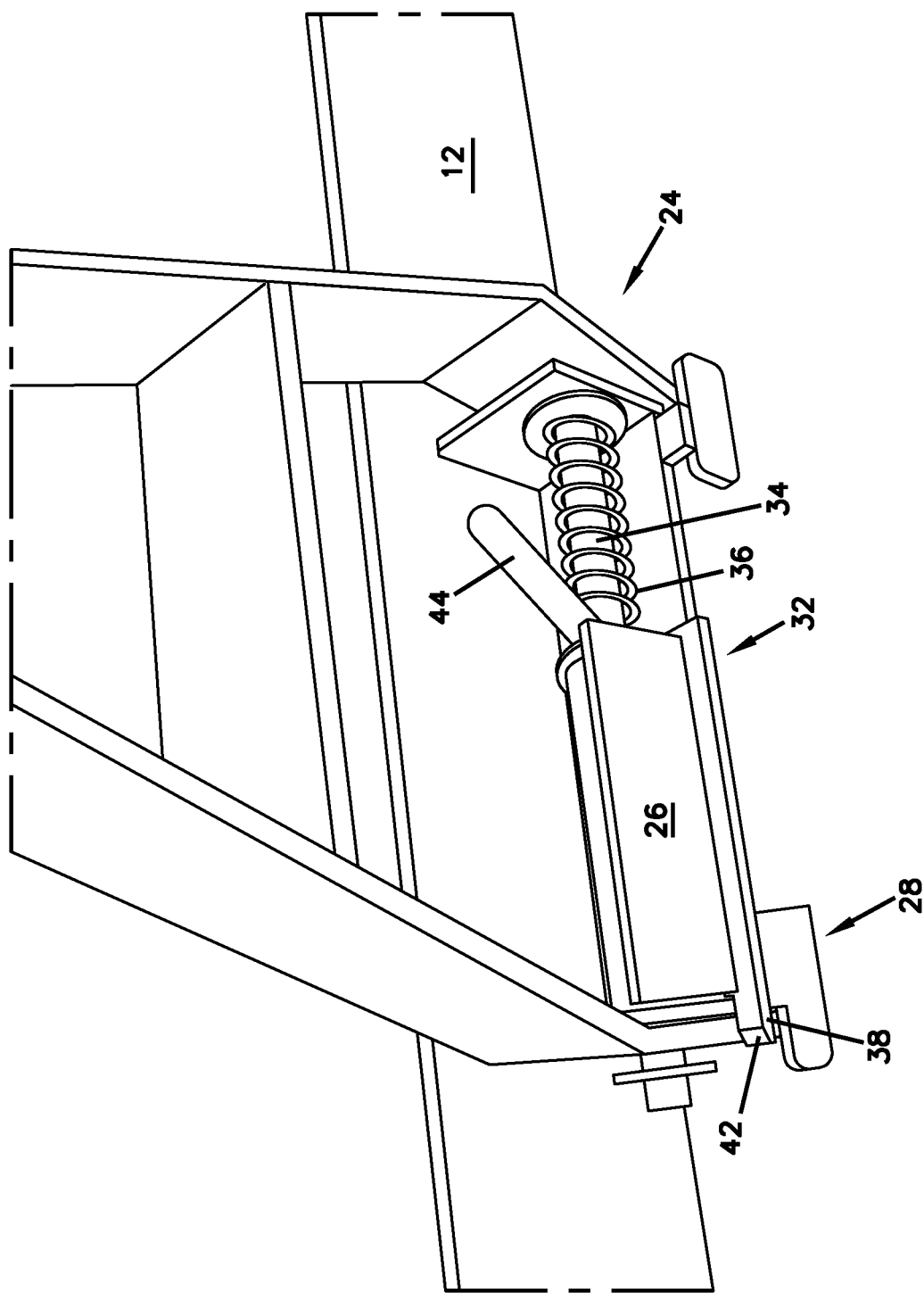
FIG. 5 is a perspective view of a drawbar locking mechanism of the cart of FIG. 1 in a disengaged orientation.
Figure 6:
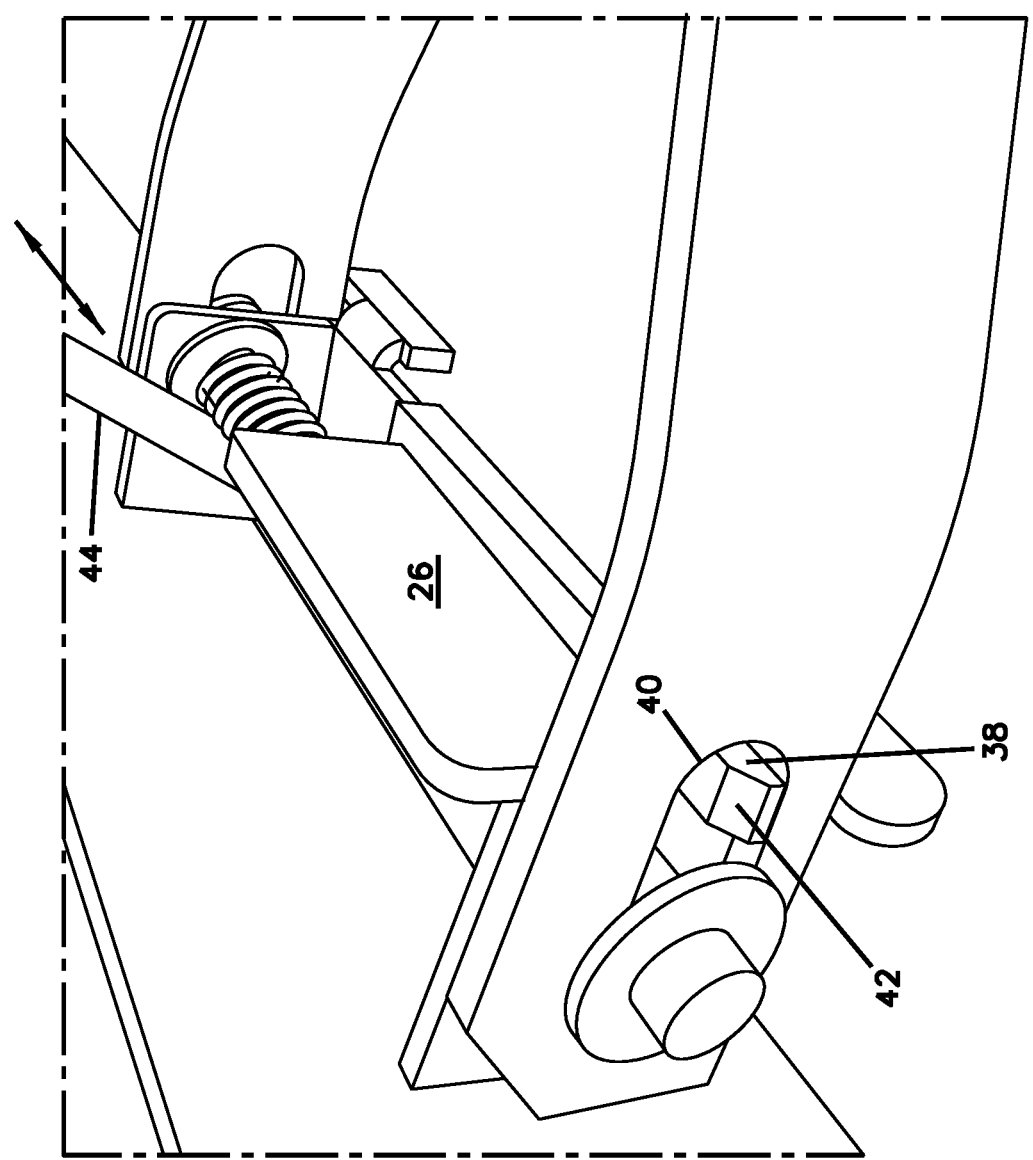
FIG. 6 is a perspective view of a drawbar locking mechanism in an engaged orientation.
Figure 7:
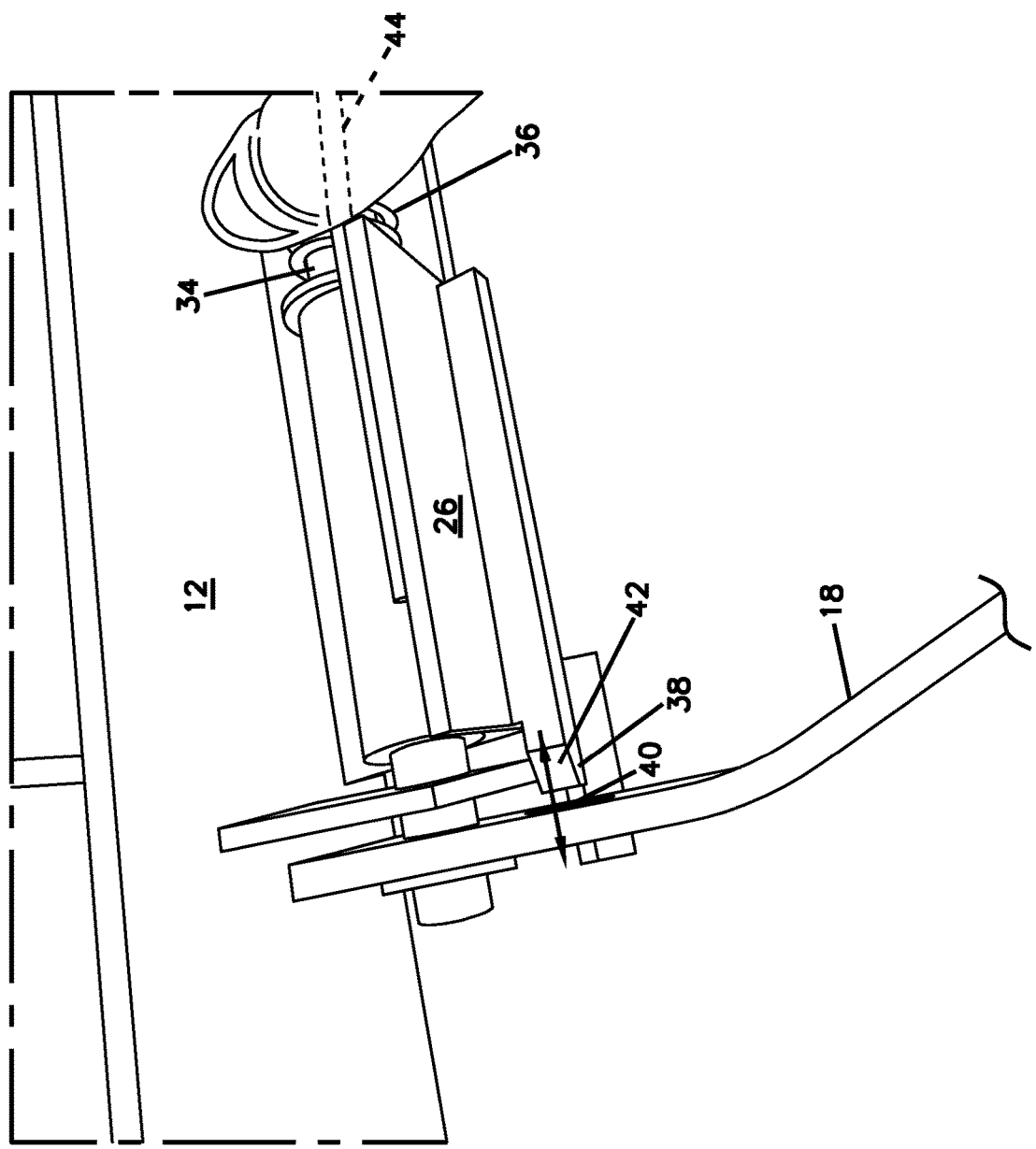
FIG. 7 is a perspective view of a drawbar locking mechanism in a manual disengaging orientation.
Figure 8:
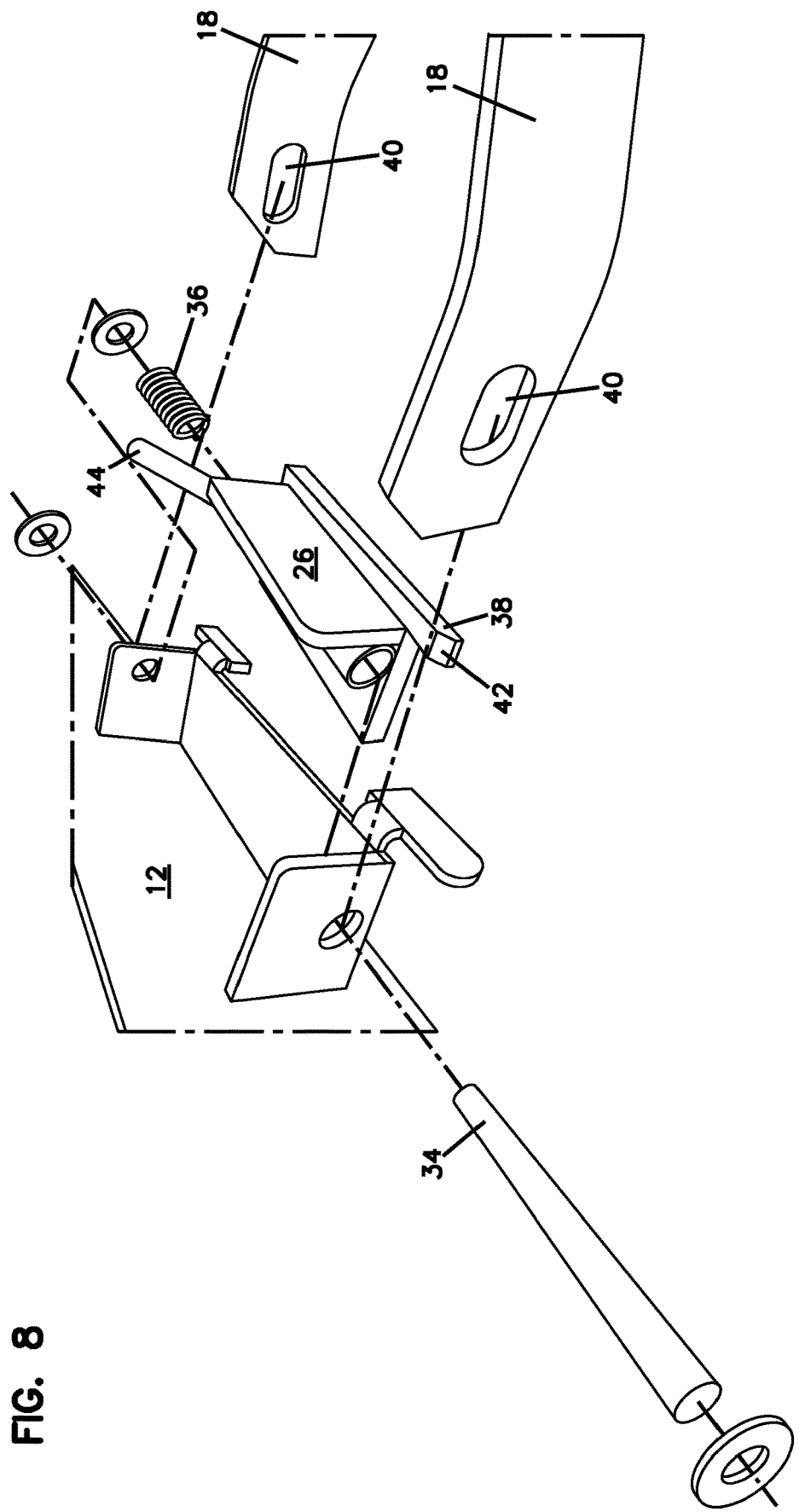
FIG. 8 is an exploded perspective of the drawbar locking assembly according to the present disclosure.

In the depicted embodiment, the cart 10 includes a drawbar locking mechanism 24 configured to automatically limit a pivot range of motion of the drawbar about a horizontal axis once the drawbar is moved from a raised disengaged position (FIG. 5) to a low engaged position (FIG. 6). In the engaged position, the drawbar is prevented from pivoting upwardly thereby preventing the boss of the drawbar from inadvertently lifting out of the hitch hole. In the depicted embodiment, the drawbar locking mechanism 24 is configured to be manually disengaged (FIG. 7). The operator can manually release the locking mechanism 24 by pressing against the spring force that drives the automatic engagement of the locking mechanism. It should be appreciated that many alternative configurations are possible.

In the depicted embodiment, the locking mechanism 24 includes a main body portion 26 having a first end portion 28 and a second end portion 32. In the depicted embodiment, the main body portion 26 is coupled to a guide member. In the depicted embodiment, the guide member is a bar 34. In the depicted embodiment, the main body portion 26 rides along the bar 34. In the depicted embodiment, the bar 34 extends through a central aperture in the main body portion 26 such that it can slide left to right on the bar 34. As mentioned above, in the depicted embodiment, the bar 34 is the pivot pin that pivotally connects the drawbar 18 to the front end 12 of the chassis.

In the depicted embodiment, the locking mechanism 24 includes a coil spring 36 that is coaxially arranged with the bar 34 and is configured to bias the main body portion 26 in one direction along the bar 34. In the depicted embodiment, the coil spring 36 includes a first end positioned in direct contact with the second end portion of the main body portion 26 and a second end in direct contact with a portion of the drawbar mount. It should be appreciated that many alternative configurations are possible.

In the depicted embodiment, the locking mechanism 24 includes a drawbar engaging member 38 connected to the first end portion 28 of the main body portion 26. The locking mechanism 24 includes a drawbar engaging member receiving aperture 40 in the drawbar. The drawbar engaging member receiving aperture 40 is radially aligned with the drawbar engaging member 38. In the depicted embodiment, the drawbar engaging member 38 includes a radially tapered upper edge 42 that is configured to contact the drawbar 18 as the drawbar is lowered from the raised disengaged position (FIG. 5) to the lower engaged position (FIG. 6). Many alternative configurations are possible.

In the depicted embodiment, the locking mechanism 24 is configured such that lowering the drawbar drives the drawbar engaging member 38 away from the drawbar until the drawbar engaging member receiving aperture 40 becomes aligned with the drawbar engaging member 38. The locking mechanism 24 automatically locks the drawbar in the lowered locked position once the drawbar is engaged with the hitch of an adjacent cart or tugger. In the depicted embodiment, the locking mechanism 24 includes a manual release bar 44 connected to the second end portion 32 of the main body 26. The manual release bar 44 can be manually pushed against the force of the spring to disengage the drawbar engaging member 38 from the drawbar engaging member receiving aperture 40. While the manual release bar 44 is manually forced against the spring, the drawbar can be manually raised to disengage the drawbar from the hitch.

Figure 4:
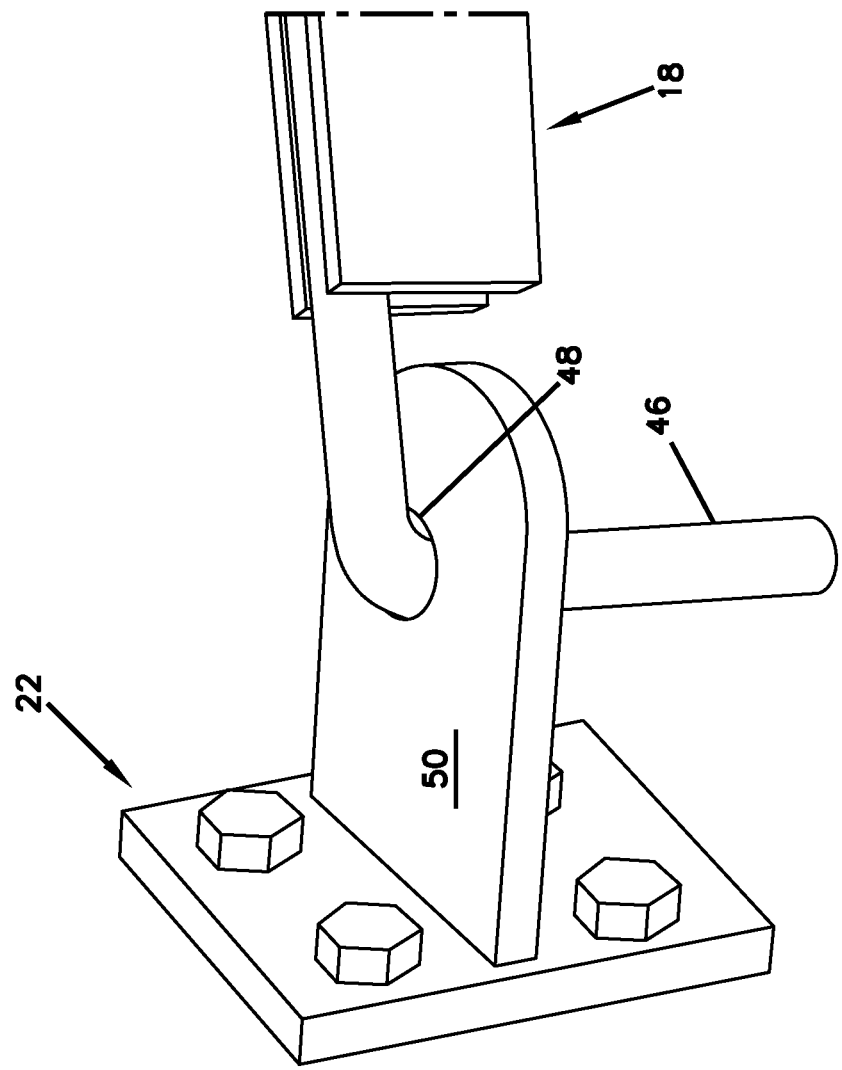
FIG. 4 is a perspective view of the drawbar of one cart connected to the hitch of another cart.

A method of coupling and decoupling carts is also described herein. In the illustrated embodiment, the method includes the step of aligning a downwardly extending boss 46 located at a distal end of a drawbar 18 of one cart with an aperture 48 in a hitch plate 50 of a different cart or a tugger (FIG. 4). The method includes the step of lowering the drawbar 18, thereby inserting the boss 46 into the aperture 48. In the depicted method, the step of lowering the drawbar 18 activates the drawbar locking mechanism 24, which limits the pivot range of the drawbar 18 about the horizontal pivot axis (i.e., prevent the drawbar from being free to pivot upwardly).

As discussed above, the method further comprises the step of manually disengaging the drawbar locking mechanism 24 by driving a lever arm 44 against the force of the spring 36 and simultaneously manually lifting the drawbar away from the hitch 50. The step of driving the lever arm 44 can be done with the user's hand. Alternatively, the user can activate the lever arm 44 with his or her foot.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A cart comprising:
   a chassis having a front end and a rear end;
   a plurality of wheels connected to the chassis configured to support the chassis;
   a drawbar pivotally connected to the front end of the chassis;
   a hitch assembly connected to the rear end of the chassis; and
   a drawbar locking mechanism configured to automatically limit a pivot range of motion of the drawbar about a horizontal axis once the drawbar is moved from a raised disengaged position to a low engaged position, wherein the drawbar locking mechanism is configured to be manually disengaged;
   wherein the locking mechanism includes a main body portion having a first end portion and a second end portion, the main body portion being coupled to a guide member;
   wherein the guide member is a bar and the main body portion rides along the bar; and
   wherein the bar pivotally connects the drawbar to the front end of the chassis.

2. The cart of claim 1, further comprising a spring that is coaxially arranged with the bar and is configured to bias the main body portion in one direction along the bar.

3. The cart of claim 1, wherein the locking mechanism includes a drawbar engaging member connected to the first end portion of the main body portion.

4. The cart of claim 3, wherein the locking mechanism includes a drawbar engaging member receiving aperture in the drawbar, the drawbar engaging member receiving aperture being radially aligned with the drawbar engaging member.

5. The cart of claim 4, wherein the drawbar engaging member includes a beveled upper edge that is configured to contact the drawbar as the drawbar is lowered from the raised disengaged position to the lower engaged position.

6. The cart of claim 5, wherein the locking mechanism is configured such that lowering the drawbar drives the drawbar engaging member away from the drawbar until the drawbar engaging member receiving aperture becomes aligned with the drawbar engaging member.

7. The cart of claim 1, wherein the locking mechanism includes a manual release bar connected to the second end portion of the main body portion.

8. A cart comprising:
   a chassis having a front end and a rear end;
   a plurality of wheels connected to the chassis configured to support the chassis;
   a drawbar mount extending from the front end of the chassis;
   a drawbar pivotally connected to the front end of the chassis via a pin that extends horizontally through the drawbar and the drawbar mount, the pin defining a pivot axis of the drawbar;
   a hitch assembly connected to the rear end of the chassis;
   a drawbar locking mechanism configured to automatically limit a pivot range of the drawbar about the pivot axis once the drawbar is moved from a raised disengaged position to a low engaged position, wherein the drawbar locking mechanism includes:
      a main body portion having a first end portion, a second end portion and a through aperture that extends through the main body portion, the main body portion being slidably engaged over the pin,
      a coil spring coaxially arranged with the pin configured to bias the main body portion in a first direction;

a drawbar engaging member connected to the first end portion of the main body portion, the drawbar engaging member including a tapered upper edge; and wherein the drawbar includes a drawbar engaging member receiving aperture that is radially aligned with the drawbar engaging member relative to the pivot axis.

9. The cart of claim 8, wherein the locking mechanism is configured such that lowering the drawbar drives the drawbar into contact with the tapered upper edge of the drawbar engaging member thereby driving the main body in a second direction opposite the first direction.

10. The cart of claim 8, wherein the locking mechanism includes a manual release bar connected to the second end portion of the main body.

11. The cart of claim 8, wherein the coil spring includes a first end positioned in direct contact with the second end portion of the main body portion and a second end in direct contact with a portion of the drawbar mount.

* * * * *